United States Patent [19]

Gavin et al.

[11] 4,313,852

[45] Feb. 2, 1982

[54] CATALYSTS

[75] Inventors: Derek G. Gavin, Longhope; Michael A. Jones, Quedgeley, both of England

[73] Assignee: Coal Industry (Patents) Limited, London, England

[21] Appl. No.: 165,014

[22] Filed: Jul. 1, 1980

[30] Foreign Application Priority Data

Aug. 10, 1979 [GB] United Kingdom ............. 27995/79

[51] Int. Cl.³ ........................ B01J 27/02; B01J 21/02
[52] U.S. Cl. ..................................... 252/439; 252/432
[58] Field of Search ................................ 252/439, 432

[56] References Cited

U.S. PATENT DOCUMENTS

| | | | |
|---|---|---|---|
| 2,123,623 | 7/1938 | Brown | 252/439 X |
| 2,192,125 | 2/1940 | Brown et al. | 252/439 |
| 2,415,817 | 2/1947 | Gohn et al. | 252/439 X |
| 2,435,380 | 2/1948 | Archibold et al. | 252/439 |
| 2,455,713 | 12/1948 | Voorhies et al. | 252/439 |
| 2,976,254 | 3/1961 | Mason et al. | 252/439 |
| 3,812,028 | 5/1974 | Wennerberg et al. | 208/112 |
| 3,997,473 | 12/1976 | Schmitt et al. | 252/439 |
| 4,032,435 | 6/1977 | Schmitt et al. | 208/216 |
| 4,082,652 | 4/1978 | Voorhies | 208/216 |

FOREIGN PATENT DOCUMENTS

| | | |
|---|---|---|
| 745468 | 2/1933 | France . |
| 44441 | 10/1934 | France . |
| 7532505 | 5/1976 | France . |
| 47362 | 12/1939 | Netherlands . |
| 7603197 | 9/1976 | Netherlands ............. 252/439 |
| 404422 | 1/1934 | United Kingdom . |
| 640455 | 7/1950 | United Kingdom . |
| 1060749 | 3/1967 | United Kingdom . |
| 1446323 | 8/1976 | United Kingdom . |
| 1471589 | 4/1977 | United Kingdom . |
| 1538330 | 1/1979 | United Kingdom . |

*Primary Examiner*—Delbert E. Gantz
*Assistant Examiner*—William G. Wright
*Attorney, Agent, or Firm*—Stevens, Davis, Miller & Mosher

[57] ABSTRACT

A hydrotreating catalyst which is resistant to carbonaceous deposits and is particularly useful for hydrotreating coal-derived liquids, is molybdenum or tungsten disulphide in an amount of 0.1 to 10% by weight, substantially completely on the outer surface of an active carbon support having a surface area in excess of 800 m²/g. The catalyst can be made by absorbing molybdenum or tungsten trisulphide onto the active carbon support and reducing the trisulphide to the disulphide.

13 Claims, No Drawings

CATALYSTS

This invention concerns hydrotreating catalysts, more especially it concerns catalysts suitable for use in the hydrogenation and/or hydrocracking of coal-derived materials such as coal extracts or coal-oil slurries.

It has previously been proposed for hydrocracking reactions of heavy petroleum feedstocks to use catalysts which are composed of metal sulphides of Group VIB and/or Group VIIIB of the Periodic Table supported on or composited with oxide compounds such as alumina, alumina/silica or silica. These catalysts are generally prepared by impregnation of the dry oxide support with aqueous solutions of the metals, as salts or complexes, followed by calcination above 600° C. to decompose the metal salts to the metal oxides. Typically, catalysts of this type would consist of molybdenum or tungsten oxides together with cobalt or nickel oxides supported on alumina or alumina and silica. Precious metal or nickel catalysts are commonly used for hydrogenation reactions but suffer the drawback of being readily poisoned by sulphur-containing compounds. Coal-derived materials in particular contain significant amounts of sulphur-containing compounds.

In the current interest by hydrotreating coal-derived materials for the synthesis of chemical feedstocks and fuels, the greatest interest has been in catalysts based on molybdenum or tungsten sulphides promoted by cobalt or nickel sulphides, and several are commercially available as petroleum hydrotreating catalysts.

It has been found that this type of catalysts has certain disadvantages. When the catalysts are reduced and sulphided to their active form some of the molybdenum or tungsten oxide is not converted to the sulphide form owing to an interaction of the molybdenum or tungsten with the alumina support. Full use of the molybdenum or tungsten is only obtained when these metals are in a sulphided state.

The supports alumina and silica are compounds having acidic surfaces which can be utilised for instance in catalytic cracking. Cracking invariably gives carbonaceous deposits which eventually poison catalysts and block reactors. The carbonaceous deposits require to be burned off or the catalysts regenerated. Regeneration leads to further problems in that catalysts tend to abrade, giving off a dust which could block valves at reactor outlets. Also, especially with oxide supports of high surface areas, for example 250–300 m$^2$/g, the support is prone to sintering when heated, leading to a loss of surface area, pore volume and catalytic activity.

To convert the polycyclic aromatic compounds which are present in coal extracts to lower boiling mono-, di- and tri-cyclic compounds, the polycyclic compounds must be highly hydrogenated. This is required for two reasons. Firstly, aromatic compounds have planar rings whereas hydrogenated cyclic molecules are not planar and are strained. Consequently hydrogenated cyclic molecules thermally crack more readily and at lower temperatures than aromatic molecules. Secondly, polycyclic aromatic compounds tend to condence to higher molecular weight compounds when heated whereas hydrogenated polycyclic compounds do not condense. Accordingly, strongly hydrogenating catalysts are required. Molybdenum and tungsten on alumina catalysts have a limited hydrogenation activity because the surface area of oxide supports is limited to below 300 m$^2$/g and because much of the molybdenum and tungsten components are unavailable for catalysis, being buried in pores within the support body. The reason for this unavailability of the catalytic material is that in conventionally recommended preparations the dry supports are impregnated with the metal solutions, and is reflected in high metal loadings, for example 10–25% metal loadings in the case of commercial catalysts, are required for adequate activity. This is in contrast to precious metal catalysts on pelleted supports in which metal concentrations are generally in the range 0.3–1.0%, the metal being available for catalysing. Lower metal loadings are also desirable to hinder sintering of the catalytic component, which would have a higher dispersion on the support.

It is therefore the aim of the present invention to provide a catalyst and a method for its production, which catalyst comprises molybdenum or tungsten on a support which has a non-acidic surface, heat stable surface area four or five times greater than alumina, with lower metal loadings than customary and in which the molybdenum or tungsten sulphide is readily available. These properties give catalysts which have improved hydrogenation activity, are less prone to carbonaceous deposits and are less expensive to manufacture.

Accordingly, the present invention provides a hydrotreatment catalyst comprising molybdenum or tungsten disulphide in an amount of 0.1 to 10%, preferably 0.5 to 2.5%, by weight, on an active carbon support having a surface area in excess of 800 m$^2$/g and in which the molybdenum disulphide or tungsten disulphide is substantially completely on the outer surface of the particles of active carbon. It will be understood from a consideration of the method of producing such catalysts described hereinafter that the active catalyst is substantially excluded from the body of each particle of active carbon and is thus substantially completely on the outer surface, that is not dispersed in internal pores but is accessible to coal-derived liquids under suitable hydrotreating conditions. It will be recognised that the extremely rugged surface and the multitudinous pores of active carbon, as a consideration of the high surface areas involved indicate, create difficulties in defining the effective outer surface. It may be considered as the surface which is not that of internal pores to which the species to be hydrotreated are denied access because of their molecular size. Preferably not more than 10% of the active catalyst is present in internal pores.

The present invention also provides a method of producing catalysts according to the invention, which method comprises absorbing molybdenum trisulphide or tungsten trisulphide onto an active carbon support having a surface area in excess of 800 m$^2$/g and having its internal pores filled with a fluid, preferably water, and reducing the trisulphide to the disulphide. Preferably the trisulphide is absorbed by preparing a solution of thiomolybdate or thiotungstate ions and adjusting the pH of the solution to change the thio compounds to colloidal molybdenum or tungsten trisulphide. The reduction is suitably carried out using hydrazine, formic acid sodium formate, sodium borohydride or hydrogen gas. The catalyst prepared is suitably washed with water before drying, for example at 110° C.

The active carbon support may be made from coal, peat, nut shells such as coconut shells, wood or bone char. The support may be in the form of a powder, or preferably in the form of granules or extrudates, and preferably has a wide pore size range and a surface area of 1300 to 1500 m²/g and preferably a size of 1.0 to 5.0 mm in diameter.

Preferably, the support is soaked in water for about 30 minutes during which time the pores become filled with water, eliminating air. More preferably, the excess water is drained away and further water added and drained, to remove carbon fines. Finally, excess water is decanted from the support.

A thiomolybdate or tungstate solution can be made by dissolving the metal trioxide in a sodium sulphide solution. Sufficient metal trioxide is used to give the desired metal disulphide concentration on the catalyst since all the metal trisulphide is absorbed on the carbon surface, making the method extremely efficient in utilisation of the molybdenum or tungsten. The pH of the freshly made sodium thiomolybdate or thiotungstate solution is approximately 12 and this pH is reduced to between 8 and 11 by adding a dilute acid such as hydrochloric acid. When the pH of the thio solution is reduced there is a marked colour change, from pale yellow to deep red in the case of the formation of colloidal $MoS_3$. If the pH is reduced too far, for instance to pH 5 the trisulphide will not absorb onto the carbon.

The colloidal suspension of the trisulphide is added to the carbon support and within 30 minutes all the trisulphide is absorbed by the carbon, this being indicated by a loss of colour from the liquid phase in contact with the carbon.

Preferably, the catalyst is heated to 80° to 100° C. and a reducing agent is added to reduce the trisulphide to the disulphide.

If desired, a promoter such as cobalt or nickel sulphide is used, and this is conveniently incorporated before the reduction by adding a solution of a cobalt or nickel salt or complex, whereby the metal sulphide precipitates onto the catalyst. When a promoter is incorporated in the catalyst, additional sodium sulphide is used in preparing the thiomolybdate or tungsten solution in a quantity sufficient to precipitate the nickel or cobalt as sulphide. The concentration of promoter, that is nickel and/or cobalt sulphides, is suitably 0.03 to 4.0%, preferably 0.16 to 0.8% by weight of the final catalyst. The preferred concentration ratio of molybdenum or tungsten to nickel or cobalt is between 3 and 4 expressed as the metals, on a weight % basis.

The catalysts according to the invention are active hydrotreating catalysts and are especially suitable for use in the hydrotreating of coal-derived materials.

The invention will now be described by way of example.

EXAMPLE 1

20 g of a granular active carbon having a size of 5–10 B.S. Sieve, (size range 1.68 to 3.35 mm) derived from coconut shells and having a surface area of 1300 m²/g was soaked in water for 30 minutes and washed fines free. Excess water was drained away. A stock solution of sodium thiomolybdate was prepared by dissolving 7.5 g of $MoO_3$ in a solution of 18 g of sodium sulphide dihydrate in 80 ml of water. The volume of the stock solution was adjusted to 100 ml. 4 ml of the stock solution was diluted to 25 ml with water and the pH adjusted from 12 to 9.5 with dilute hydrochloric acid solution to give a red suspension of $MoS_3$. This solution was added to the carbon and left to stand for 30 minutes, after which time there was no molybdenum in suspension. The temperature was raised to 90° C. and 0.2 ml of hydrazine hydrate solution was added to reduce the $MoS_3$ to $MoS_2$. The catalyst was washed in water and dried at 105° C. The product catalyst contained 1% Mo as $MoS_2$.

EXAMPLE 2

A catalyst was made in a similar way to Example 1, but only 2 ml of the stock solution of molybdenum was used to give 0.5% molybdenum on the catalyst.

COMPARATIVE CATALYST A 20 g of dry active carbon was impregnated with a solution of ammonium molybdate to give 15% molybdenum as the oxide. The catalyst was dried and heated to 250° C. to decompose the salt to $MoO_3$. The catalyst was sulphided with $H_2S$ and reduced in hydrogen gas.

COMPARATIVE CATALYST B

A commercial catalyst consisted of 15% molybdenum oxide, promoted with cablt oxide, on alumina. This catalyst was found to be best catalyst in standard tests for hydrotreating activity among many commercial catalysts of this type.

The above catalysts were tested for hydrocracking ability on a coal extract solution made by dissolving crushed coal in an anthracene oil and filtering off the ash and undissolved coal. The boiling range of this material is shown in the table below.

Catalysts were tested under identical conditions in an autoclave, using the same quantities of extract solution and catalyst, at 450° C. and 210 bar hydrogen pressure for two hours. The criteria for hydrocracking activity of the catalysts was the loss of high boiling residue boiling above 420° C. and the gain in distillates boiling below 300° C. as determined by distillation of the hydrocracked products. Gas production in all cases was about 2–3% by weight of the feed and hence only liquid products were compared. In the case of Examples 1 and 2, the hydrocracked products constituting the coal oil were transparent and yellow in colour. Using the catalysts of Comparative Examples A and B, and using no catalyst, the products were opaque and drak brown to black in colour.

The table below lists the distillation ranges of the coal oils showing the greatest conversion activity for the catalysts of the invention, at low concentrations of $MoS_2$.

| | | Products from Tests on Catalyst Examples | | | | |
|---|---|---|---|---|---|---|
| Distillation Range (°C.) | Feed | 1<br>1% $MoS_2$<br>on carbon | 2<br>0.5% $MoS_2$<br>on carbon | A<br>15% $MoO_3$<br>on carbon (sulphided) | B<br>CoMo on $Al_2O_3$<br>(15% $MoO_3$)<br>sulphided. | No catalyst |
| IBP - 300° | 11.1 | 35.9 | 34.9 | 32.3 | 23.6 | 15.8 |
| 300–420° | 61.2 | 57.7 | 57.2 | 54.1 | 59.3 | 59.3 |
| >420° | 27.7 | 6.4 | 5.9 | 13.6 | 17.1 | 24.9 |

We claim:

1. A hydrotreatment catalyst comprising molybdenum or tungsten disulphide in an amount of 0.1 to 10% by weight, on an active carbon support having a surface area in excess of 800 $m^2/g$ and in which the molybdenum or tungsten disulphide is substantially completely on the outer surface of the particles of active carbon, said catalyst prepared by absorbing molybdenum or tungsten trisulphide onto an active carbon support having a surface area in excess of 800 $m^2/g$ and having its internal pores filled with a fluid, and reducing the trisulphide to the disulphide.

2. A catalyst as claimed in claim 1, wherein the concentration of molybdenum or tungsten disulphide is from 0.5 to 2.5% by weight.

3. A catalyst as claimed in claim 1 or 2, wherein the active carbon support has a surface area of 1300 to 1500 $m^2/g$.

4. A catalyst as claimed in claim 1, comprising also a promoter which is a cobalt and/or nickel sulphide.

5. A catalyst as claimed in claim 4, wherein the promoter is present in an amount of from 0.03 to 4.0% by weight.

6. A catalyst as claimed in claim 5, wherein the promoter is present in an amount of from 0.16 to 0.80% by weight.

7. A catalyst is claimed in claim 4, wherein the ratio of molybdenum or tungsten to nickel and/or cobalt in between 3 and 4, expressed as the metals on a weight % basis.

8. A method of producing a catalyst comprising molybdenum or tungsten disulphide in an amount of 0.1 to 10% by weight, on an active carbon support having a surface area in excess of 800 $m^2/g$ and in which the molybdenum or tungsten disulphide is substantially completely on the outer surface of the particles of active carbon comprising absorbing molybdenum or tungsten trisulphide onto an active carbon support having a surface area in excess of 800 $m^2/g$ and having its internal pores filled with a fluid, and reducing the trisulphide to the disulphide.

9. A method as claimed in claim 8, wherein the fluid is water.

10. A method as claimed in claim 9, wherein the active carbon support is admixed with a colloidal suspension of molybdenum or tungsten trisulphide.

11. A method as claimed in claim 10, wherein the colloidal suspension is prepared by adjusting the pH of a solution containing the thiomolybdate or thiotungstate ions.

12. A method as claimed in claim 8, 9 or 10 wherein the reduction is effected using hydrazine, formic acid, sodium formate, sodium borohydride or hydrogen gas.

13. A method as claimed in claim 8, 9 or 10, wherein a promoter is incorporated in the catalyst by adding to the support with absorbed molybdenum or tungsten trisulphide, as solution of a cobalt and/or nickel salt or complex, precipitating nickel and/or cobalt sulphide and absorbing it on the support.

* * * * *